Patented Aug. 14, 1928.

1,680,818

UNITED STATES PATENT OFFICE.

HARRY STEENBOCK, OF MADISON, WISCONSIN, ASSIGNOR TO WISCONSIN ALUMNI RESEARCH FOUNDATION, A CORPORATION.

ANTIRACHITIC PRODUCT AND PROCESS.

No Drawing. Application filed June 30, 1924. Serial No. 723,171.

This invention relates particularly to a method of preparing antirachitic products of edible character, such as foods and medicines, and to the products obtained by such method of treatment.

The process is effected by subjecting edible substances to the action of rays of the region of the ultra violet rays of the spectrum in such manner as to effect the antirachitic activation, care being taken to avoid the destruction of the antirachitic principle after it has been imparted. The sterilization of water by means of ultra violet rays is known. Also, it has been proposed to sterilize milk by means of ultra violet rays, but the treatment given to the milk to effect sterilization has also had the effect of spoiling the taste and otherwise injuring the milk, and thus this method of sterilization has failed to come into commercial use. Also, it has been proposed to employ X-rays, or Roentgen rays, to effect sterilization. These rays are not suited to the present purpose, however.

It has not been known prior to the present invention that it is possible to so treat edible products by the use of ultra violet rays as to render them antirachitic. The present invention enables this to be effected with a wide variety of edible substances suited to the needs of mankind and animals. The treatment is understood to impart other favorable properties to the substances treated.

It is known that the so-called vitamins possess various properties and are intimately concerned with the maintenance of bodily processes, and thus are inseparably connected with the normal physiology of the animal, including man. Thus, it is commonly accepted that vitamin A functions to prevent certain types of infections, because its absence from the diet results in inflammation of the eyes, or inflammation of the respiratory tract, the growth of the animal ceases, and, if the condition be not corrected, death usually results from pneumonia; the absence of vitamin B from the diet is likely to result in cessation of growth, paralysis of the digestive tract, failure of appetite, ultimate neuritis, and death from convulsions; and the absence of vitamin C from the diet is likely to result in scurvy, hemorrhages, and accompanying distressing symptoms. Also, there is now supposed to exist a vitamin known as the antirachitic vitamin, whose function is to preserve the normal deposition of calcium salts in the bones, thus preventing rachitis, or the disease commonly known as rickets. Again, there is supposed to exist a substance known as factor X, which is concerned with the maintenance of the function of reproduction.

The present invention is particularly concerned with the so-called antirachitic vitamin, but it is to be observed that it is possible to prepare food stuffs for man, and feeds for animals, possessing the properties, or principle, of two or more of the so-called vitamins. The same is true with respect to medicines.

It has long been known that cod liver oil is an excellent therapeutic agent for the prevention and cure of rickets in children. This product, known on the market as cod liver oil, is produced from the livers of certain fishes, most notably the cod fish. However, cod liver oil is not well adapted for use in foods, or as medicine, because of its highly objectionable odor and taste.

It was first supposed that fats, generally, might possess the antirachitic principle, but it has been found that such is not the case; and it is now known that the antirachitic vitamin is not generally distributed in nature, and this fact is attested to by the fact that rickets is a disease common to man and animals to a surprising degree. It has been stated in the Etiology of Rickets by E. A. Park, Physiological Reviews, vol. 3, p. 111, 1923: "Schmorl (6) found that ninety per cent of the children in Dresden under four years of age who died between the years 1901 and 1908 and more than ninety-six per cent of the infants showed evidences of rickets, and Hess (23) himself has reported that rickets was exceedingly prevalent among the children in the Hebrew Infant Assylum in New York city, where presumably the chemical investigations of the blood were made." There are many manifestations of rickets, including permanent deformity of the legs, contracted pelves, chests, maxilla and abnormal dentition.

The present invention has for its primary object the provision of a process by which various articles of food and various medicines may have imparted to them the antirachitic principle, or factor, and thus be rendered antirachitically active, in a very simple and effective manner, and without rendering such products objectionable, in any degree, from the standpoint of odor and taste.

Referring again to the subjects of fats, generally, with the exception of cod liver oil, fats are generally lacking in the antirachitic factor. Butter is known to contain the vitamin A, and, in a slight degree, it is understood to contain the so-called antirachitic vitamin. Cocoanut oil seems to possess the antirachitic factor in still less degree than butter, and with less uniformity. Both of these substances are greatly deficient in the antirachitic factor, however; and so far as now known, cod liver oil is the only substance containing this factor in such a large degree as to enable its use as a specific for rachitis.

According to the present invention, feeds for animals, and food products for man, and medicines for man and animals, may have imparted to them the antirachitic factor, or may be rendered antirachitically active by subjecting them to the action of actinic rays and especially the rays in the region of the ultra violet rays of the spectrum, such as emanate from a mercury vapor lamp. The activation is very readily effected by means of a quartz mercury vapor light, though the open flame carbon arc, or other source of light may be employed in effecting the activation.

As an example, olive oil may be antirachitically activated by moderate exposure to the action of the rays of a quartz mercury vapor lamp rich in ultra violet rays, and, generally spoken of, as ultra violet light. This may be accomplished, for illustration, by placing in a shallow dish, having a length of about ten inches and a width of about five inches, olive oil to a depth of about one-eighth of an inch, and exposing the oil to the action of the rays of a Cooper-Hewitt quartz mercury vapor lamp, type BY, for about thirty minutes, such lamp having an arc of about one and one-half inches initially, and operated by current at about forty-eight volts and a current of about four amperes, the source of light being placed at a distance of about two feet from the oil. Thus treated, the oil acquires an antirachitic strength substantially equal to that of cod liver oil.

The length of time of the exposure to the rays may vary greatly, depending upon the volume of the product being treated, the manner in which it is exposed, the intensity of the light, and the distance of the material from the light. It should be pointed out, however, that an over exposure is possible. For example, if treatment under the conditions mentioned above is continued for a period of seventeen hours, it is found that the olive oil, at first activated by the moderate treatment, changes its physical and chemical character, and loses the antirachitic factor. It has been found, also, that cod liver oil treated under such exposure for a period of seventeen hours loses its antirachitic factor. In practice, the exposure will be properly regulated to produce the desired effect of imparting the antirachitic factor to the material being treated, it being understood that the intensity of the light employed, the time of exposure, and the various factors entering into the treatment will vary with the method employed.

Various foods for man and animals may be antirachitically activated in the manner suggested above. This applies both to solid and liquid foods, including those comprising proteins, carbohydrates and fats. Fats and oils activated in this manner afford a very convenient medium for introducing activated material into various foods, or rations, including solid foods, oils, salad dressings, etc. Also, activated fats afford a convenient medium for introducing the activated material into medicines; or, selected activated fats may be obtained in the form of an extract, or in condensed form, and used in tablets, or in capsules, for medicinal purposes.

In general, the process is applicable to the treatment of organic substances having food or medicinal value. Examples are: meat, or muscle; cereals, grains and seeds; hulls, brans; oils and fat of various kinds, such as corn oil, peanut oil, cocoanut oil, cottonseed oil, oleo oil, olive oil, lard, tallow, etc.; and grains, roughage, or mixtures thereof may be irradiated and have imparted to them the antirachitic factor. In the same manner, dog biscuit, feed for chicks, and various other feeds for animals may be activated. It is practicable, of course, to activate one material of a ration, and mix the activated material with other unactivated materials of the ration. For example, corn oil, or other oil, may be activated and mixed with a feed for cows, or other animals.

Butter, or butter fat, may be activated without injuring the vitamin A contained in the butter. This may be done by maintaining the butter in a inert atmosphere, such as an atmosphere of carbondioxide, while the butter is being irradiated by means of the ultra violet rays. Again, milk may itself be treated and activated to a certain extent, or milk, as well as artificial baby foods, may have admixed therewith an activated oil, or other activated substance. The artificial baby foods may themselves be directly exposed to the action of ultra violet rays and be thus activated, if desired. The same is true with regard to breakfast foods, cereals, etc.

In the oils and fats, it appears that the unsaponifiable constituents may be highly activated; and these unsaponifiable lipoids may be separated from the saponifiable fats.

The activation of the lipoids may be effected either before or after separation from the saponifiable fats or constituents. For example, olive oil may be activated by subjecting it to the action of the ultra violet rays; the activated oil may be saponified by boiling it thirty minutes in a 20% solution of KOH in alcohol; the material may then be diluted with water; the unsaponifiable substances may be extracted with ether; the extract in ether may be washed; and the ether solution may be mixed with food and the ether evaporated, or allowed to evaporate. The result is to impart to the food the antirachitic property. If desired, the ether may be evaporated from the solution, and thereby the activated lipoid may be obtained in the form of a waxy material. This may be used in suitable capsules, or may be compounded with other materials into capsule form, or may be used in any suitable manner for medicinal purposes. In this manner, the activated material may be obtained in concentrated form.

On the other hand, if desired, the lipoids may be separated from the olive oil by any suitable method, and the lipoids may then be activated by exposure to ultra violet rays. Other substances relatively rich in lipoids may be employed for the purpose of obtaining extracts, or concentrated activated material. For example, brains obtained from slaughter houses may be mixed with plaster Paris, thus producing a friable compound; the unsaponfiable lipoids may be extracted from the mass with acetone; the acetone may be evaporated and the unsaponifiable lipoids cause to separate out, they may then be dissolved in alcohol and boiled with a solution of a caustic base, such as KOH or NaOH, for thirty minutes; the product may be washed or diluted with water and the lipoids extracted with ether; the ether solution may be mixed with food and the ether caused to evaporate, or the ether may be separately evaporated and the unsaponifiable ingredients obtained as a waxy material. The activation may be produced either by subjecting the brain matter to the action of the ultra violet rays or by subjecting the extracted unsaponifiable constituents to the action of ultra violet rays.

It may be stated here that the activated material maintains its activated condition for prolonged periods; and while it has not been determined what rate of loss, if any, may occur, the activated condition is maintained for a sufficient length of time for the practical purposes suggested herein.

Oleomargarine may be activated by direct treatment with the ultra violet rays, or it may have supplied to it the antirachitic principle by activating an oil, such as olive oil, and mixing the activated oil with the oleomargarine; or, if desired, concentrated activated material may be obtained in the manner suggested above, and supplied to the oleomargarine.

Various other methods of making practical use of the invention will readily occur to those skilled in the art. It was found, for instance, that a ration of millet seed 84, casein 12, and salts 4, when subjected to treatment by ultra violet light for thirty minutes, under substantially the conditions mentioned above for treating olive oil was greatly improved in its power to support growth in the rat. It has been found, also, that improved growth and proper formation of bone occur concurrently as the result of activation of the food in the manner herein described. It has been definitely established that the irradiated ration, or irradiated food, will serve to cure rachitic bone. It has been established, both chemically and by bone appearance, that the calcium metabolism may be maintained at the normal, by use of activated foods or materials, under various conditions when it is difficult for the animal, for one reason or another, to maintain the proper growth and structure of the bone without such aid.

While I do not rest the present invention upon any theory, I give it as my belief that the effect of activating food materials is to cause the activated constituent to emit, in the body, rays which perhaps are of invisible character, and which, in some manner, cause the calcium depositing cells of the bone to function properly. In this respect, the activated material may emit rays somewhat analogous to the manner in which activated zinc sulphide emits, in the dark, rays which excite the retina, and thus are visible. It is, however, not excluded that the effect may be produced by a structural rearrangement in some compound or compounds contained in the food materials.

It has been found that lard can be activated in the same manner as the various oils can be activated. Bone known to be definitely rachitic shows a more or less characteristic histological bone picture. On the other hand, normal bone produces a picture distinct from that of the rachitic bone. The rachitic bone may be restored to the normal by feeding the animal a properly activated ration.

A ration of corn 33, wheat 33, wheat gluten 15, gelatine 15, sodium chloride 1 and calcium carbonate 3 produces in rats, within a period of a few weeks, distinct rachitic conditions. On the other hand, such a ration, when properly activated, or supplied with activated material, will maintain the proper growth and bone structure.

From the description and statements thus far given, it will be understood that the invention is important from various standpoints. The use of an activated feed for chickens, cattle, and other stock, would have a two-fold object: It would enhance the economical production of pork, beef and chicken, together with eggs, milk and the various products of milk; and it would furthermore increase the antirachitic content of these products, and thus benefit man directly.

For man, this invention has particular value. For the adult, solid foods, such as manufactured breakfast foods, flour, meals, dry fruits, and fats and oils, such as cocoanut oil, lard, olive oil, cottonseed oil, peanut oil, oleo oil, etc. may be directly activated and used. For the pregnant and lactating mother, usually closely confined indoors, and to a lesser degree, for the growing boy or girl such activated foods will be particularly beneficial. By the general use of such activated food by the lactating mother, the antirachitic properties of milk will be increased, thus minimizing the early incidence of rickets in the child, and obviating the various defects in the child which arise from a rachitic condition. Again, the child itself may be fed on modified milk foods, grain extracts, or other preparations, which have been activated by light, or which have had admixed therewith activated substances; or, if desired, the child may be given activated oils in medicinal doses. These activated oils have the advantage of being practically tasteless, and without objectionable odor; and suitable flavors may be added to good effect.

In addition to the value of the invention in connection with infant foods and butter substitutes, the invention finds a most useful application to medicinal preparations. Activated oils, or activated unsaponifiable constituents thereof, may be used for such purpose, as suggested above.

The time and manner and exposure of the food or material to the action of the actinic rays must be varied with the nature of the material exposed, and various other factors, as suggested above. These factors will readily be determined by those skilled in the art, in view of the explanation given above; and in actual practice, activated materials may be subjected to actual test, from time to time, to insure proper manufacture. Fats spread out in a thin layer on conveyor belts may be exposed to the action of light; liquid materials may be allowed to flow in films while being subject to a light treatment; or liquids, such as oils, may be exposed by spraying them through a zone acted upon by the actinic rays. In this connection, it is to be borne in mind that the ultra violet rays do not pass readily through glass; and where vessels are employed through which rays are to pass, such vessels should be of quartz, or of very thin glass.

The oils mentioned above are liquid glycerides which are fairly rich in unsaponifiable lipoids. These oils constitute an important subdivision of the fats.

The palatability of the treated foods may be injured or destroyed by undue prolongation of the irradiation. This is to be avoided.

Sunlight, of course, contains ultra violet rays, but it is not available practically for the production of the antirachitic principle. Artificial light rich in the rays of the ultra violet region of the spectrum is necessary. Roentgen rays (X-rays) have a wave length definitely below that which is necessary in the process, and thus are not suitable for use in the process.

In dealing with fats and oils, such as olive oil, maximum activation can be effected in a period of about thirty minutes by the treatment mentioned above. The treatment may be prolonged for a considerable period, under such conditions, without injury, but if unduly prolonged and if too intensive, the antirachitic principle will be destroyed.

Apparently, in the case of fats (including oils) some changes ultimately occur in the non-activated constituents which neutralize, or destroy, the antirachitic principle previously produced by the treatment in the unsaponifiable fats. On the other hand, if the lipoids be separated before treatment, it is found that the treatment can be prolonged through a period of many hours without destroying the antirachitic principle. This seems to be true, also, of such substances as corn meal. It follows that in the case of the fats (including oils), especially, care should be taken to avoid over-irradiation.

Eggs, more particularly the yolks of eggs, may be activated antirachitically by the process described; also, as indicated above, cholesterol, before or after separation from other fats, may be activated antirachitically by the process described.

What I regard as new, and desire to secure by Letters Patent, is:

1. The process of imparting antirachitic properties to organic substances of dietary value (for example carbohydrate foods, fats, oils, protein foods, or composite foods), which comprises subjecting the same to the action of ultra-violet rays, such as are produced by a quartz mercury vapour lamp, for a period sufficient to effect antirachitic activation but so limited as to avoid subsequent substantial injury of the antirachitic principle.

2. The process set forth in claim 1 as applied to oils and fats containing unsaponifiable lipoids.

3. The process set forth in claim 1 as applied to naturally liquid glycerides.

4. The process set forth in claim 1 as applied to olive oil.

5. Naturally deficient (in the antirachitic factor) food substance antirachitically activated in accordance with the process set forth in claim 1.

6. The naturally deficient (in the antirachitic factor) liquid glycerides containing constituents antirachitically activated in accordance with the process set forth in claim 1.

7. Olive oil antirachitically activated in accordance with the process set forth in claim 1.

8. The process of imparting antirachitic properties to organic substances of dietary value (for example carbohydrate foods, fats, oils, protein foods, or composite foods), which comprises subjecting the same to the action of ultra-violet rays, such as are produced by a quartz mercury vapour lamp, for a period sufficient to effect antirachitic activation but so limited as to avoid subsequent substantial injury to either the antirachitic principle or the palatability.

HARRY STEENBOCK.